Patented May 1, 1934

1,957,358

UNITED STATES PATENT OFFICE 1,957,358

PROCESS OF PRODUCING CAFFEIN-FREE COFFEE

Erich Scheele, Osterdeich, Bremen, Germany

No Drawing. Application July 6, 1932, Serial No. 621,125. In Germany July 7, 1931

5 Claims. (Cl. 99—11)

Hitherto the caffein has usually been removed from coffee by subjecting green coffee beans to a preliminary treatment with water or aqueous liquids at raised temperature and thereupon extracting with caffein-dissolving agents, such as for instance benzine, benzol, trichlorine-ethylene or the like, whereupon the extraction agent is drawn off and the beans during an after treatment are completely freed from rests of the extraction agent. The arrangements used for moistening the coffee with steam, water or aqueous liquid are rather expensive, particularly the rotating extracting devices, which also suffer from the drawback, that they frequently turn leaky. It has also been proposed to extract the green coffee beans in centrifuge by means of suitable solvents.

Finally it is known to treat the coffee beans with an ammonia-containing aqueous fluid and subsequently with a solvent adapted to take up the alkaloid from the ammonia-containing fluid. The ammonia releases the caffein from the coffee beans and the result of this is, that the caffein readily passes over into the surrounding fluid. From this fluid the caffein is thereupon removed by the solvent.

All known processes require the before mentioned preliminary treatment with steam or water at raised temperature. The extraction of the caffein can only be performed subsequently to the preliminary treatment and the older processes thus involve two separate stages of operation.

The object of the present invention is to provide for a simple treatment of coffee beans to remove the caffein substantially completely in a single stage of operation.

According to the invention the solvent for the caffein is caused to act upon the coffee beans in emulsified state. The treatment may be carried out with a previously prepared emulsion, but it is also possible to produce the emulsion during the treatment. Suitably the solvent is emulsified with water when it is in contact with the coffee beans and is acting upon the same. By carrying out the process in this manner the special moistening stage is avoided, since the solvent for the caffein and the water act upon the coffee beans simultaneously. When working in this manner also the extraction process is advantageously influenced, because the solvent will penetrate the cells of the coffee beans together with the water.

A further advantage of the novel process resides in the fact that common stationary extractors may be used for the lixiviation of the caffein instead of the very expensive rotating extraction devices hitherto used. The rotating extractors are of low efficiency and work in the whole very ineconomically, but it was hitherto not possible to dispense with the use of same at the extraction of coffee beans, since the moistening or wetting stage of the process could not be carried out in extractors of simpler design.

According to the present invention an emulsion of an organic caffein-solvent and water is caused to act directly on the coffee beans. The emulsion is suitably produced and maintained by moving both fluids continuously during the extraction. The emulsion may for instance be produced by calling forth a continuous intermixing or interwallowing movement of the fluids (solvent and water). A very effective manner of intermixing the fluids consists for instance in sucking off the fluids at the top and the bottom of the apparatus, reintroducing same and passing the emulsion through the coffee beans. By this treatment a thorough penetration of the coffee beans is secured and the caffein is completely extracted.

*Example*

1000 kg. of air-dried coffee-beans are filled into a vertically arranged preferably cylindrical extraction vessel, whereupon the solvent (for instance trichlorine-ethylene, chloroform, benzol or the like) is added. Thereupon 400 kg. of water are added and the vessel is closed. The contents of the vessel is heated and both fluids, i. e. solvent and water, are caused to circulate and wallow rapidly in order to form the emulsion. The fluids may for instance be intermixed by means of a propeller or another stirring device or by means of a pump of sufficient capacity. If a pump is used the fluids may for instance be sucked off at great velocity from the bottom of the container and be reintroduced into the same at the upper level of the charge. This circulating movement may of course also be reversed. The vertical flow caused by this circulation will effect a thorough intermixing of the substances in the vessel and the emulsion is rapidly formed. The specific weight of the solvent used is without importance. The extraction may therefore if desired be carried out with solvents which are heavier than water or with solvents which are lighter than water.

When the fluids have been intermixed for about 30 minutes the coffee beans will have absorbed the water completely. The extraction may now be continued in the usual manner. After the extraction has been completed the coffee beans are heated in order to remove the last remains of the solvent from the same. The caffein may be separated from the solvent in any suitable manner.

It is a particular advantage of the process according to the invention, that only the caffein is removed and that other valuable aromatic or flavoring constituents are retained in the coffee beans.

I claim:—

1. A process of producing caffein-free coffee, comprising the step of treating the coffee beans with an emulsion of an organic solvent and water.

2. A process of producing caffein-free coffee, comprising the steps of treating the coffee beans with an emulsion of an organic solvent and water and heating the mixture during the treatment.

3. A process of producing caffein-free coffee, comprising the steps of acting upon coffee beans with water and a caffein-solvent and emulsifying the said solvent during the treatment.

4. A process of producing caffein-free coffee, comprising the steps of acting upon coffee beans with water and a caffein-solvent and intermixing the water and the solvent continuously and circulating same through the body of coffee-beans, in order to emulsify the solvent.

5. A process of producing caffein-free coffee, comprising the steps of introducing coffee beans, an organic solvent and water into a vessel, closing and heating the vessel, forming an emulsion of the solvent and the water, allowing this emulsion to act upon the coffee beans for a predetermined period and maintaining the solvent and water in emulsified state during the treatment.

ERICH SCHEELE.